W. B. SCHULTE.
DRY BATTERY.
APPLICATION FILED MAR. 13, 1919.
1,408,140.
Patented Feb. 28, 1922.
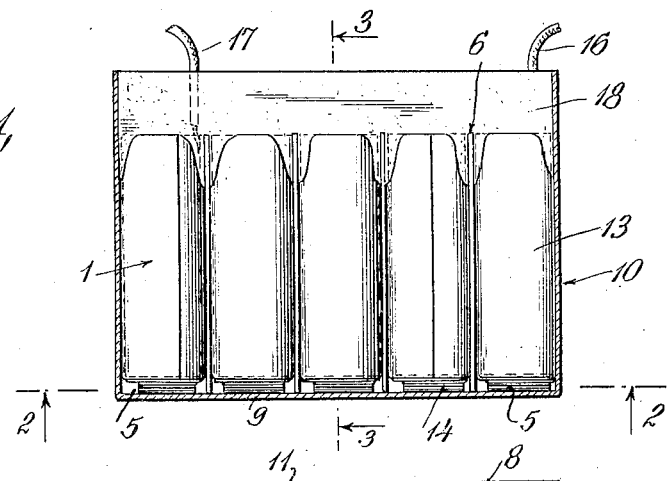
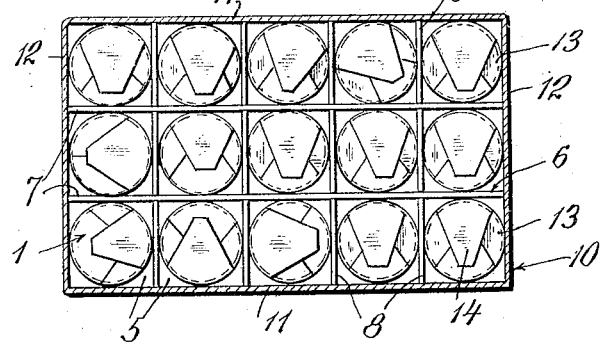
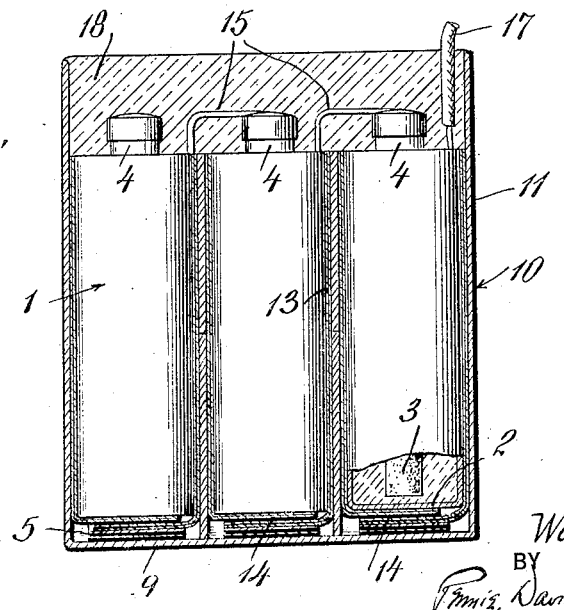
INVENTOR
Walter B. Schulte
BY
ATTORNEYS

UNITED STATES PATENT OFFICE.

WALTER B. SCHULTE, OF MADISON, WISCONSIN, ASSIGNOR TO BURGESS BATTERY COMPANY, A CORPORATION OF WISCONSIN.

DRY BATTERY.

1,408,140.   Specification of Letters Patent.   Patented Feb. 28, 1922.

Application filed March 13, 1919. Serial No. 282,394.

*To all whom it may concern:*

Be it known that I, WALTER B. SCHULTE, a citizen of the United States, residing at Madison, in the county of Dane, State of Wisconsin, have invented certain new and useful Improvements in Dry Batteries; and I do hereby declare the following to be a full, clear, and exact description of the invention, such as will enable others skilled in the art to which it appertains to make and use the same.

This invention relates to dry batteries; and it comprises certain improvements, hereinafter fully described, in the construction and arrangement of the component cells of such batteries, whereby short-circuiting between adjacent cells is effectually prevented even in the event of leakage of any of the cells, or of entry of moisture into the jacket or container in which the battery is fitted.

According to the invention, the cells are arranged vertically within the individual compartments provided for them in a nest which rests upon the bottom wall or floor of the container and is constructed of waterproofed material. They are slightly shorter than these compartments, so that they are thereby maintained free of contact with the bottom of the container, from which it follows that any leakage which may occur in a compartment, due to corrosion taking place along the side of the can of the cell therein, will be prevented from reaching an adjacent cell and causing short-circuiting, and similarly with respect to any moisture which may happen to have entered the container from outside. This protection of the cells against short-circuiting may be greatly increased by encasing each cell in a wrapper of water-proofed material, inasmuch as such material constitutes an actual barrier between the water or other liquid and the zinc cans of the cells which is impermeable to the passage of the liquid through it.

Other improved features of the invention will appear as the description thereof proceeds; but it is to be understood that the invention is not limited to the precise structural details referred to in such description and illustrated in the accompanying drawing, in which a practical embodiment of the invention is represented, excepting in so far as may be necessitated by the terms of the appended claims.

In the drawing:—

Fig. 1 is a side elevation of a battery constructed in accordance with the invention, the container or jacket of the battery appearing in section;

Fig. 2 is a horizontal section, taken on line 2—2 of Fig. 1; and

Fig. 3 is a vertical cross-section, on an enlarged scale, taken on line 3—3 of Fig. 1.

The battery shown in the drawing comprises a series of small cylindrical cells 1 of counterpart construction and of more or less conventional type, each cell embodying a zinc can or cup 2 forming one electrode of the cell and an axially disposed carbon rod 3 forming the other electrode, each carbon rod being fitted with a metal terminal or cap 4. The cells are arranged vertically in individual compartments 5, provided for them in a nest 6, which is constructed of interlocking longitudinal and transverse strips 7 and 8 of pasteboard or other suitable sheet material, preferably impregnated with a waterproofing substance such as paraffin. The lower edges of the strips 7 and 8 rest directly upon the bottom member 9 of a pasteboard case or jacket 10, likewise impregnated with paraffin, which is adapted to contain the battery and which forms the bottom wall of the compartments, the side edges of the strips contacting directly with the end and side walls 11 and 12 of the case. The several dimensions of the compartments are somewhat greater than those of the cells, so that under ordinary conditions the cells would be maintained out of contact at all points with the walls of the compartments, the space between the lower ends of the cells and the bottom wall of the case exceeding that which would ordinarily exist between the side walls of the cells and their compartments. These spaces, however, are taken up to some extent by the wrappers 13 in which the cells are encased, the wrappers being fitted on the cells prior to the insertion of the latter in their compartments. They are constructed of sheets of waxed paper which completely enclose the cells with the exception of their upper ends, which are left open, the lower edges of the wrappers being tucked under and folded against the bottoms of the cells as indicated at 14, so that an increased thickness of wrapping is provided at such points.

After having been fitted with their paper wrappers in the manner above described, the cells are inserted in their compartments, and are thereafter electrically connected together by wire strips 15, which extend from the zinc electrode of one cell to the carbon electrode of the next cell, the several wires being soldered or otherwise fastened at one end to the upper ends of the zinc cans and at the other end to the brass caps 4. Suitable conducting leads 16 and 17 are then attached to the cells, and the latter and their nest are then inserted in the case or jacket 10, though this second step may take place before the connection of the cells is effected; or, if preferred, the nest may be inserted in the case prior to the positioning and connection of the cells. The nest itself terminates some distance below the upper edge of the case, and is fixed therein, together with the cells, by a seal 18 of pitch or other suitable substance which fills the upper portion of the case and penetrates a slight distance into the compartments 5, thus coming into contact with the paper wrappers on the cells, as well as with the walls of the compartments, and serving to anchor the cells in place. In this way, the entire structure is transformed into a single unitary body or unit in which the cells are rigidly sealed in the nest as well as in the case itself, and their wrappers securely fastened thereon, while the electrical connections between the cells are embedded in the material forming the seal and, hence, are not liable to become detached or injured.

Owing to the fact that the bottoms of the cells terminate short of the bottom wall 9 of the case, whereas the lower edges of the partition strips 7 and 8 rest on said wall 9, any liquid which may collect on the bottom of a compartment, whether from an extraneous source or from leakage, will not touch the cell in the compartment, and moreover, will not ordinarily penetrate into the adjacent compartments but will tend to remain in the compartment in which it originated. Consequently, the danger of adjacent cells becoming short-circuited because of the presence of moisture is greatly reduced, especially since the walls both of the nest and of the case are rendered water repellant by being treated with paraffin. The effects thus produced are furthered and increased to a very considerable extent by the provision of the paraffined wrappers in which the cells are encased, for these wrappers not only interpose a layer of water-repellant material on all sides of the cells and between the latter and the corresponding walls of the compartments, which prevents exposure of the zinc and consequent leakage in the event of corrosion taking place, but they provide a double or triple thickness of such material at the only point where moisture can accumulate to an appreciable extent from any source. Hence, the continued efficiency of the battery while in use, and an exceptionally long shelf life thereof, are insured without adding to any great extent to the initial cost of the battery.

It will be observed that the in-folded portions of the wrappers at the bottoms of the cells occupy practically all of the space between the bottoms of the cans or cups and the bottom wall of the case. This in-folded portion, in consequence, provides a yielding support for the cell on which it rests during the operation of soldering the conductors 15 to the cap portions of the carbon rods 4. Any excess pressure which may be accidentally imposed upon the cells during this operation will be taken up by said in-folded portion, and, hence, will not cause breakage of the usual seals at the top of the cells, which might easily occur if the cans rested directly upon a rigid support during the operation.

I claim as my invention:—

1. A dry battery comprising a case, a nest fitted therein and providing a set of separate, vertical compartments, and dry-cells fitting in said compartments respectively with their lower ends spaced from the bottoms of the compartments; substantially as described.

2. A dry battery comprising a case, a nest fitted therein and providing a set of separate, open-ended vertical compartments. the lower edges of the walls of the compartments resting directly upon the bottom member of the case, and dry-cells fitting in said compartments respectively with their lower ends spaced from said bottom member; substantially as described.

3. A dry battery comprising a case, a nest fitted therein and consisting of interlocking longitudinal and transverse strips of sheet material treated with a water-repellant substance, said strips providing a set of open-ended, vertical compartments and having their lower edges resting directly upon the bottom member of the case, and dry-cells fitting in said compartments respectively with their lower ends spaced from said bottom member; substantially as described.

4. A dry battery comprising a case, a nest fitted therein, and a set of cells anchored in the nest at their upper ends and having their lower ends spaced from the bottom member of the case, each cell having a water-repellant wrapper completely encasing it; substantially as described.

5. A dry battery comprising a case, a nest fitted therein, a set of vertical dry-cells arranged in the nest and spaced at their lower ends from the bottom of the case, electrical connections between the upper ends of the cells, and a seal anchoring said cells in said nest and embedding said electrical connections; substantially as described.

6. A dry battery comprising a case, a nest fitted therein, a set of vertical dry-cells arranged in the nest and spaced at their lower ends from the bottom of the case, a water-repellant wrapper completely encasing each cell, and a seal anchoring the cells in said nest and the wrappers to said cells; substantially as described.

7. A dry battery comprising a case, a nest fitted therein and providing a set of open-ended vertical compartments, the lower edges of the walls of the compartments resting upon the bottom member of the case, a dry-cell fitting in each compartment with its lower end spaced from said bottom member, and a water-repellant wrapper completely encasing each cell and fastened to it; substantially as described.

8. A dry battery comprising a case, a nest fitted therein, and a set of cells anchored in the nest at their upper ends and having their lower ends spaced from the bottom member of the case, each cell having a wrapper of waxed paper completely encasing it; substantially as described.

9. A dry battery comprising a case, a nest fitted therein and providing a set of vertical compartments, and dry cells fitting in said compartments, respectively, with their lower ends spaced from the bottoms of the compartments, each cell being encased in a water-repellant wrapper, substantially as described.

In testimony whereof I affix my signature.

WALTER B. SCHULTE.